UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 740,072, dated September 29, 1903.

Application filed July 21, 1902. Serial No. 116,456. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification, and pointed out in the claims.

The composition in the present instance consists of an intimate mixture in molecular proportions of precipitated zinc sulfid and barium sulfate, and while the composition itself is not new the process, so far as I am aware, is novel. Broadly stated, the process contemplates the successive precipitation of barium sulfate and zinc sulfid (or vice versa) from solutions capable of precipitating one or the other of said compounds, leaving a second or intermediate solution from which can be precipitated the remaining compound and a resulting solution corresponding to the first solution, from which can again be precipitated the first compound, and so on. In other words, the solution remaining as a result of the chemical reactions incident to the precipitation of one of the compounds serves as a reagent for precipitating the second compound, and the final solution after such second precipitation corresponds to the first solution from which the first precipitate was derived. It therefore results in a cyclical process or a process which is self-contained, since it does not result in any waste product or solution not capable of being utilized as a direct reagent in the process.

The object, therefore, of my process is to avoid the production of any waste products or any product not capable of being directly employed as a reagent in the formation of the precipitates constituting the composition above referred to.

As an illustration of the general principle above enunciated, I prepare one molecular equivalent of an aqueous solution of sodium sulfate to which I add one equivalent of barium sulfid. The result of the mixture is a precipitate of one molecular equivalent of barium sulfate and a solution of one equivalent of sodium sulfid. To this intermediate solution is added one equivalent of a solution of zinc sulfate, when there is precipitated on top of the barium sulfate one equivalent of zinc sulfid, leaving a final or resulting solution of one equivalent of sodium sulfate to be used over again with a new addition of barium sulfid, and so on, so that the process is a continuous one, the solution remaining after any single precipitation always serving as a reagent for the next precipitation. This condition may be expressed by the following reaction:

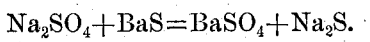

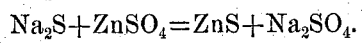

It is of course immaterial which solution is the initial one. If we start with the sodium-sulfid solution, the reactions may be expressed as follows:

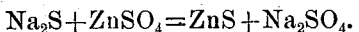

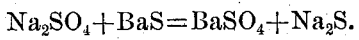

In either case there results the consecutive precipitation of zinc sulfid and barium sulfate, (or barium sulfate followed by zinc sulfid,) with the further result that the solution remaining after any precipitation is used for a subsequent precipitation, the solutions never passing out of the cycle of reagents employed in the process. I may of course substitute any of the alkali metals for the sodium base, as above specified, and as an illustration of such substitution the following reactions, in which ammonium sulfate and ammonium sulfid are substituted, may be cited:

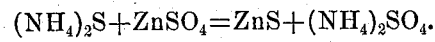

Again, where the sulfid of ammonium is the initial solution the following reactions take place:

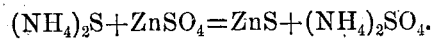

Since in the present case, as in others, the doctrine of chemical equivalents can be invoked, it follows that I may substitute (without departing from the nature of the invention) for the sulfate and sulfid salts of sodium and ammonium the corresponding salts of potassium, aluminium, or potassium aluminium, or ammonium aluminium, or a mixture of the aforesaid sulfates or sulfids, respectively. Such substitution will in no wise affect the status or functions of the solutions resulting from any single precipitation.

The determination of the actual quantities of the materials used in the foregoing reactions is a simple stoicheiometric problem based upon the atomic weights of the elements constituting any molecule, and as a commercial illustration of the formula contained in the first of the above reactions the following may be cited: I prepare an aqueous solution of one hundred and forty-two (142) pounds of sodium sulfate and one hundred and sixty-nine (169) pounds of barium sulfid and bring them together, when there results a precipitate of two hundred and thirty-three (233) pounds of barium sulfate and a solution of seventy-eight (78) pounds of sodium sulfid. To this is then added a solution containing one hundred and sixty-one (161) pounds of zinc sulfate, when there is precipitated ninety-seven (97) pounds of zinc sulfid, leaving a solution containing one hundred and forty-two (142) pounds of sodium sulfate, the same as at the beginning of the cycle. The process can thus be continued indefinitely.

As the repeated additions of solutions will necessarily increase the bulk of the water or solution after each reaction, means for evaporating the excess of water or solution to a smaller volume at suitable periods can be provided. Any manner of evaporation known to the art is of course available for this purpose.

It is of course apparent that I may invoke the doctrine of chemical equivalents wherever the same may apply. The precipitates may be intimately mixed after their recovery from the solutions by any of the mechanical methods known in the arts.

Having described my invention, what I claim is—

1. In the manufacture of pigments the process of adding a solution of barium sulfid to the sulfate of an alkali metal, then adding a soluble zinc salt to the resulting solution, and recovering the final precipitates, substantially as set forth.

2. In the manufacture of pigments, the process of adding a solution of barium sulfid to a solution of the sulfate of an alkali metal, then adding a solution of zinc sulfate, and recovering the resulting precipitates, substantially as set forth.

3. In the manufacture of pigments, the process of adding to a solution of one molecular equivalent of a sulfate of an alkali metal one molecular equivalent of a solution of barium sulfid, then adding to the resulting solution a solution of one molecular equivalent of zinc sulfate, and recovering the resulting precipitates, substantially as set forth.

4. In the manufacture of pigments, the process of mixing molecular equivalents of solutions of the sulfate of sodium and the sulfid of barium, then adding a corresponding molecular equivalent of a solution of zinc sulfate, and recovering the resulting precipitates, substantially as set forth.

5. The process of making pigments which consists of mixing a solution of one molecular equivalent of sodium sulfate, with one molecular equivalent of barium sulfid, then adding a solution of one molecular equivalent of zinc sulfate, recovering the precipitates, and continuing the operation indefinitely with a repetition of the addition of the several solutions in the order specified, substantially as set forth.

6. In the manufacture of pigments, the process of adding to a solution of a sulfate, a solution of barium sulfid, then adding a solution of zinc sulfate, and recovering the resulting precipitates, substantially as set forth.

In testimony whereof I affix my signature in presence of two witnesses.

WILLIAM J. ARMBRUSTER.

Witnesses:
EMIL STAREK,
G. L. BELFRY.